United States Patent [19]

King

[11] Patent Number: 5,091,949
[45] Date of Patent: Feb. 25, 1992

[54] METHOD AND APPARATUS FOR THE RECOGNITION OF VOICE SIGNAL ENCODED AS TIME ENCODED SPEECH

[76] Inventor: Reginald A. King, Merrow Down, Woolstone, Faringdon, Oxon SN7 7QL, England

[21] Appl. No.: 301,365

[22] Filed: Jan. 25, 1989

Related U.S. Application Data

[63] Continuation-in-part of Ser. No. 645,120, Aug. 28, 1984.

[30] Foreign Application Priority Data

Sep. 1, 1983 [GB] United Kingdom ............. 8323481

[51] Int. Cl.⁵ ............................................. G10L 7/08
[52] U.S. Cl. ............................................. 381/43
[58] Field of Search ................................. 381/29-50; 364/513.5; 375/122

[56] References Cited

U.S. PATENT DOCUMENTS

| | | | |
|---|---|---|---|
| 3,125,723 | 3/1964 | Spogen et al. | 381/40 |
| 3,278,685 | 10/1966 | Harper | 381/41 |
| 3,940,565 | 2/1976 | Lindenberg | 381/43 |
| 4,382,160 | 5/1983 | Gosling et al. | 381/29 |
| 4,763,278 | 8/1988 | Rajasekaran et al. | 381/43 |

OTHER PUBLICATIONS

Ewing, "Computer Recognition of Speech Using Zero Crossing Information", IEEE Trans. Audio and Electroacoustics, vol. AU-17, No. 1, 3/69, pp. 37-40.

*Primary Examiner*—Dale M. Shaw
*Assistant Examiner*—John Merecki
*Attorney, Agent, or Firm*—Kerkam, Stowell, Kondracki & Clarke

[57] ABSTRACT

There is provided an automatic voice recognition system which utilizes time encoded speech. Through the determination of zero crossing information and waveform parameters of an input voice signal, a stream of time encoded speech symbols is obtained. The stream of time encoded speech symbols is then converted into a matrix format for comparison with reference matrices formatted from time encoded symbols of reference words thereby to provide an output signal indicative of the content of the input voice signal.

15 Claims, 7 Drawing Sheets

Fig.1.
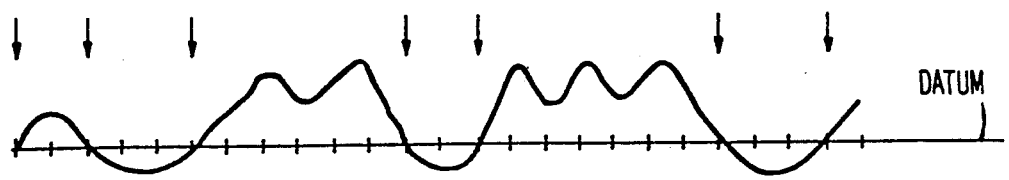
Fig.2.
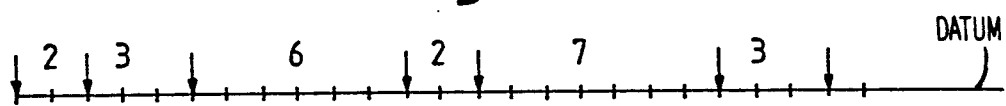
Fig.3.
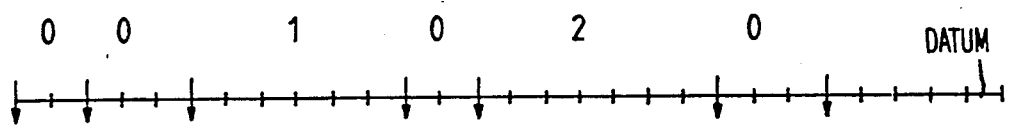
Fig.7.
```
6  1  1  1  1  1  1  1  1  1  1  2  1  2  1  1
6  1  3  6  1  2  1  5  1  1  2  1  6  4  2  4
1  1  1  5  1  1  1  2  1  1  1  2  4  2  1  1
1  6  1  1  1  1  1  1  2  4  3  2  6  6  1  2
1  2  1  1  3  1  6  3  3  5  2  4  4  3  4  2
1  2  4  2  5  5  2  4  1  1  1  1  1  1  6  1
1  1  1  8  1  1  2  1  2  2  4  1  1  2  2  5
4  2  2  1  1  6  1  5  4  3  1  1  2  4  2  5
4  2  1  1  1  1  1  1  1  2  6  4  2  1  1
1  2  1  1  2  1  1  1  2  1  1  1  1  3  1  1
1  1  1  1  1  1  1  1  1  1  4  4  2  5  2  4
8  4  1  8  1  5  1  1  2  1  1  1  1  1  1  1
1  1  1  1  1  1  2  1  1  1  1  1  1  2  1  1
1  4  2  1  3  4  1  2  1  1  1  2  1  2  1  1
1  5  1  1  1  2  1  1  1  2  1  3  4  8  1  2
1  1  1  1  1  2  1  4  1  1  1  1  1  2  5  3
```

Fig.4.

| D \ S | 0 | 1 | 2 | 3 | 4 | 5 |
|---|---|---|---|---|---|---|
| 1 | 1 | 1 | 1 | 1 | 1 | 1 |
| 2 | 1 | 1 | 1 | 1 | 1 | 1 |
| 3 | 1 | 1 | 1 | 1 | 1 | 1 |
| 4 | 2 | 2 | 2 | 2 | 2 | 2 |
| 5 | 3 | 3 | 3 | 3 | 3 | 3 |
| 6 | 4 | 4 | 4 | 4 | 4 | 4 |
| 7 | 4 | 4 | 4 | 4 | 4 | 4 |
| 8 | 5 | 6 | 6 | 6 | 6 | 6 |
| 9 | 5 | 6 | 6 | 6 | 6 | 6 |
| 10 | 5 | 6 | 6 | 6 | 6 | 6 |
| 11 | 7 | 8 | 8 | 8 | 8 | 8 |
| 12 | 7 | 8 | 8 | 8 | 8 | 8 |
| 13 | 7 | 8 | 8 | 8 | 8 | 8 |
| 14 | 9 | 10 | 11 | 11 | 11 | 11 |
| 15 | 9 | 10 | 11 | 11 | 11 | 11 |
| 16 | 9 | 10 | 11 | 11 | 11 | 11 |
| 17 | 9 | 10 | 11 | 11 | 11 | 11 |
| 18 | 9 | 10 | 11 | 11 | 11 | 11 |
| 19 | 12 | 13 | 14 | 15 | 15 | 15 |
| 20 | 12 | 13 | 14 | 15 | 15 | 15 |
| 21 | 12 | 13 | 14 | 15 | 15 | 15 |
| 22 | 12 | 13 | 14 | 15 | 15 | 15 |
| 23 | 12 | 13 | 14 | 15 | 15 | 15 |
| 24 | 16 | 17 | 18 | 19 | 20 | 20 |
| 25 | 16 | 17 | 18 | 19 | 20 | 20 |
| 26 | 16 | 17 | 18 | 19 | 20 | 20 |
| 27 | 16 | 17 | 18 | 19 | 20 | 20 |
| 28 | 16 | 17 | 18 | 19 | 20 | 20 |
| 29 | 16 | 17 | 18 | 19 | 20 | 20 |
| 30 | 16 | 17 | 18 | 19 | 20 | 20 |
| 31 | 21 | 22 | 23 | 24 | 25 | 26 |
| 32 | 21 | 22 | 23 | 24 | 25 | 26 |
| 33 | 21 | 22 | 23 | 24 | 25 | 26 |
| 34 | 21 | 22 | 23 | 24 | 25 | 26 |
| 35 | 21 | 22 | 23 | 24 | 25 | 26 |
| 36 | 21 | 22 | 23 | 24 | 25 | 26 |
| 37 | 21 | 22 | 23 | 24 | 25 | 26 |

NOTE

'D' = QUANTIZED TIME INTERVAL
= No. OF 50μs TIME QUANTA BETWEEN REAL ZEROS

'S' = No. OF POSITIVE MINIMA, OR NEGATIVE MAXIMA, BETWEEN REAL ZEROS

NUMBERS IN THE BODY OF THE TABLE ARE THE TES SYMBOLS ASSIGNED TO THE D-S COMBINATION SHOWN

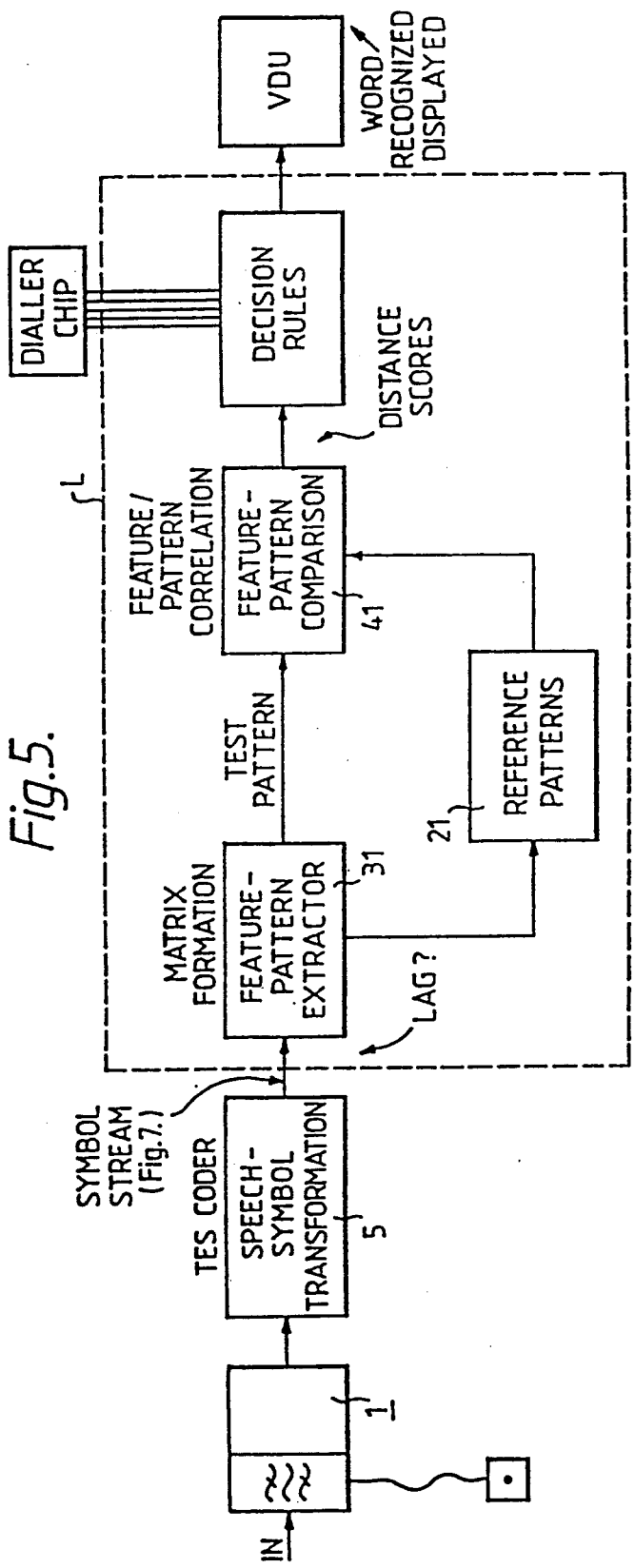
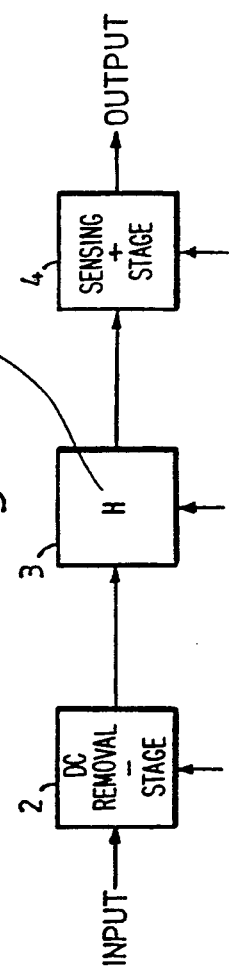

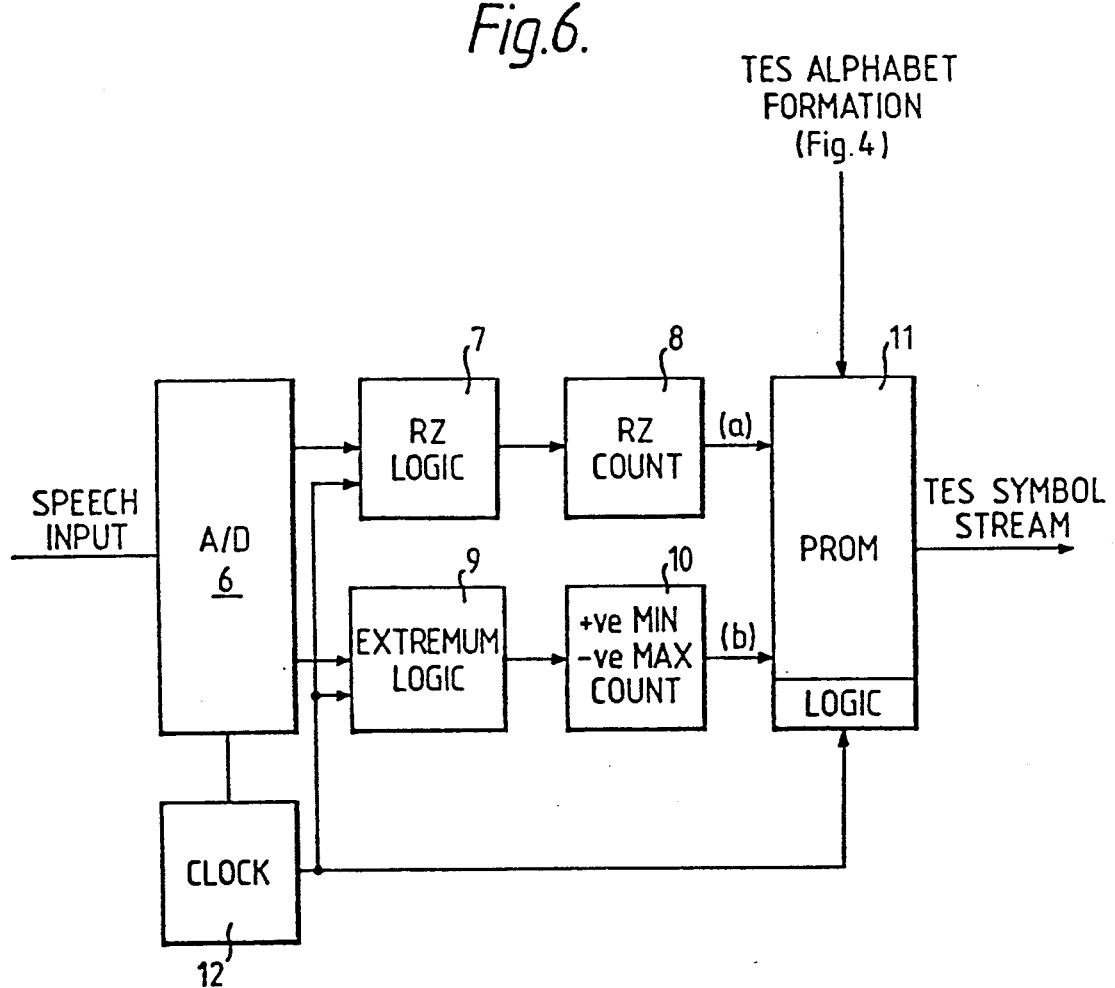

Fig.8.

'A' MATRIX FOR THE WORD 'SIX'

WORD: 'SIX'
UTTERANCE: 5 (TRAINING)

INPUT FILTERING: 300 - 3300Hz 8th ORDER BUTTERWORTH
NORMALIZATION: NONE
SPEAKER: MW (MALE)

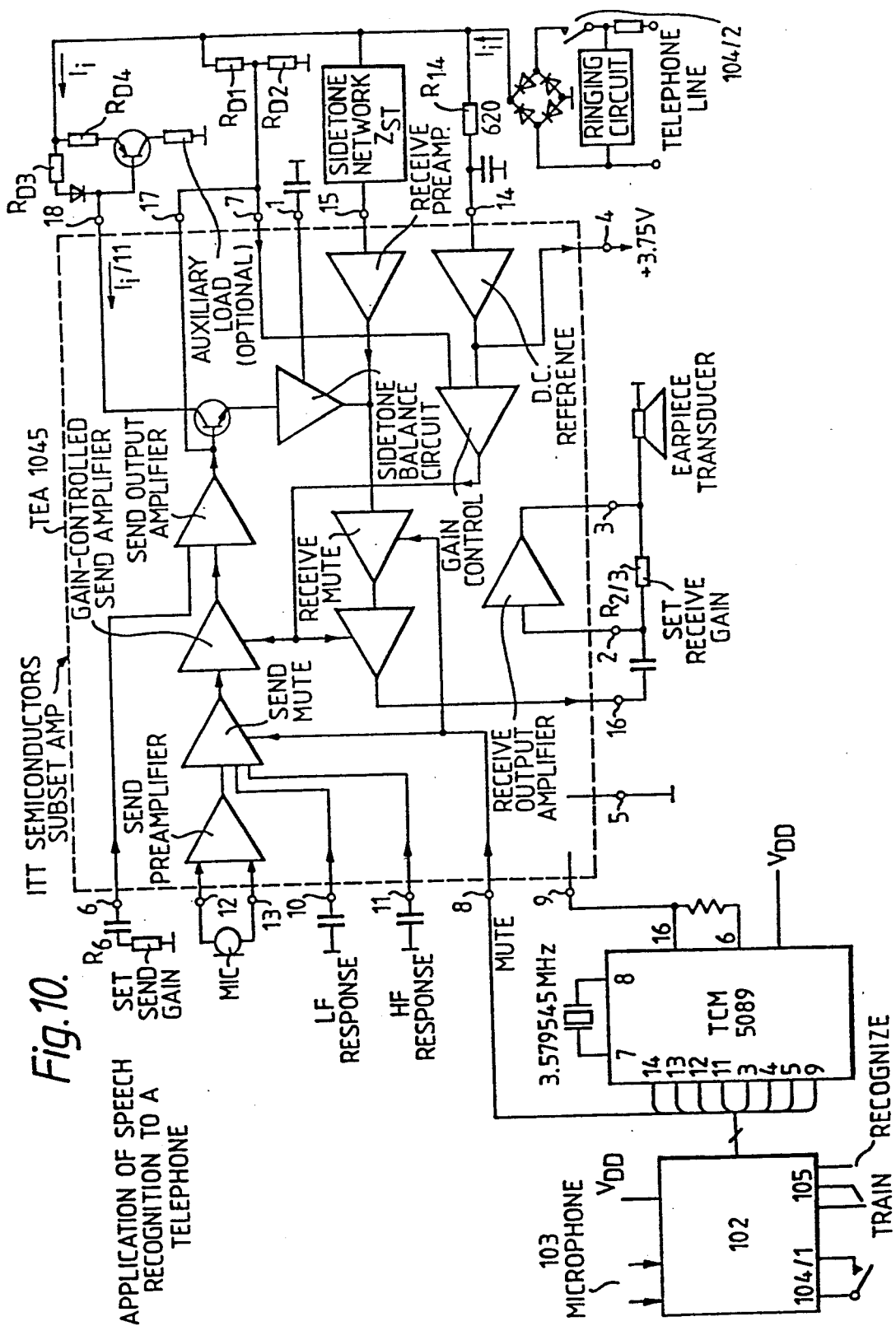

METHOD AND APPARATUS FOR THE RECOGNITION OF VOICE SIGNAL ENCODED AS TIME ENCODED SPEECH

This invention relates to a method and apparatus for the recognition of voice signals encoded as time encoded speech, and is a continuation-in-part application of U.S. patent application Ser. No. 645,120 filed Aug. 28, 1984.

In the IEEE Transactions and Communications Vo. Com-29 No. 5, May 1981, there is described the state of the art.

M. H. Kuhn of Philips GmbH., Hamburg, in European Electronics Issues 6, 1981 to Issue 1, 1982 has written a series of articles describing the theory of voice recognition and the systems devised by Texas Instruments, Philips and Bell Laboratories.

Then again, Messrs. B. E. Ray and C. R. Evans of the National Physical Laboratories, Teddington/Middlesex., wrote an article in Int. J. Man-Machine Studies (1981) 14, 13 to 27, describing their work in developing a practical system of speech recognition.

These various papers describe complete analyses and in most cases attempt to recognise a large vocabulary and even continuous speech.

In some applications only a limited vocabulary is required such as ten or twenty different instruction words to operate a machine.

Such voice recognition equipments are already commercially available, e.g.:
Nippon Electric Co. DP-200
Interstate Electronics VRC-100-1
Votan V-5000
Auricle T-950
Intel i SBC-750

They are relatively expensive and complex, operating on the principle of dividing the sounds into frequency bands with filters and analysing the energy levels in each band.

We have now discovered that a technique previously only used for speech encoding in, for example digital speech transmission applications, can be used for speech recognition in a relatively cheap, effective way.

Time encoded speech for digital transmission is known from GB A-2020 517. This document also mentions that speech and speech like sounds may be converted into an encoded or digital form which facilitates their automatic identification, for example by a computer.

A voice recognition system comprising means for detecting zero crossing information in input voice signals and waveform parameters and means for producing a coded output based on the zero crossing information and waveform parameters is know from, U.S. Pat. No. 3,278,685.

Accordingly, there is provided a method of recognising voice signals comprising determining zero crossing information in input voice signals and waveforms parameters of said signals producing a coded output based on the zero crossing information and waveform parameters, the method further comprising generating a stream of descriptors for the voice signals each descriptor comprising a time encoded symbol and representing, in combination, the time duration of a sub division of the voice signals and the waveform parameters in said sub division, the sub division containing not more than three zero crossings of the voice signal, coding the time encoded symbols in matrix format, examining relationships between matrices so formed and reference matrices formatted from time encoded symbols of reference words thereby to provide, as a result of the examination, an output signal indicative for the content of the voice signals.

According to a further aspect of the present invention there is also provided a voice recognition system comprising means for determining zero crossing information in input voice signals and waveform parameters of said signals and means for producing a coded output based on the zero crossing information and waveform parameters, means for generating a stream of descriptors for the voice signals, each descriptor comprising a time encoded symbol and representing, in combination, the time duration of a sub division of the voice signals and the waveform parameters in said sub division, the sub division containing not more than three zero crossing of the voice signal, means for coding the time encoded symbols in matrix format and means for examining relationships between matrices so formed and reference matrices formatted from time encoded symbols of reference words thereby to provide, as a result of the examination, an output signal indicative of the content of the voice signals.

In order that the invention can be more clearly understood reference will now be made to the accompanying drawing, in which:

FIG. 1 is a random speech waveform;

FIG. 2 represents the quantised duration of each segment of the waveform of FIG. 1;

FIG. 3 represents the negative maxima or positive minima occurring in each segment of the waveform of FIG. 1;

FIG. 4 is a symbol alphabet derived for use in an embodiment of the present invention;

FIG. 5 is a flow diagram of a voice recognition system according to the embodiment of the present invention;

FIG. 5a shows one arrangement in which, following prefiltering step further DC filtering occurs.

FIG. 6 shows a block diagram of the encoder part of the system of FIG. 5;

FIG. 7 shows a symbol stream for the word SIX generated in the system of FIG. 5 to be read sequentially in rows left to right and top to bottom;

FIG. 8 shows a two dimensional "A" matrix for the symbol stream of FIG. 7;

FIG. 10 is a diagram of the application of the system of FIG. 5 to a loudspeaking telephone.

Figure 9:
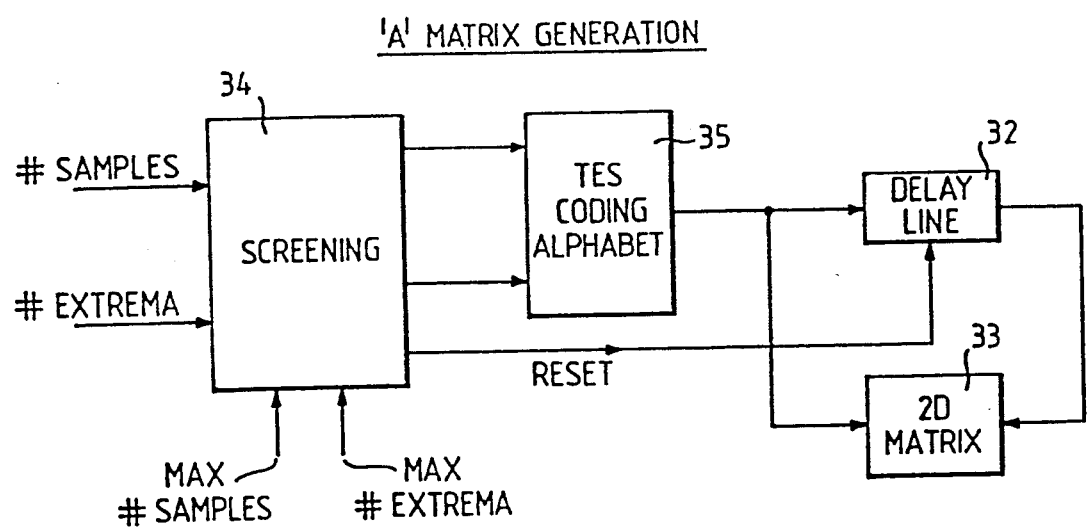
FIG. 9 shows a flow diagram for generating the A matrix of FIG. 8.

Time encoded speech is a form of speech waveform coding. The speech waveform is broken into segments between successive real zeros. As an example FIG. 1 shows a random speech waveform and the arrows indicate the points of zero crossing. For each segment of the waveform the code consists of a single digital word. This word is derived from two parameters of the segment, namely its quantised time duration and its shape. The measure of duration is straightforward and FIG. 2 illustrates the quantised time duration for each successive segment—two, three, six etcetera.

The preferred strategy for shape description is to classify wave segments on the basis of the number of positive minima or negative maxima occurring therein, although other shape descriptions are also appropriate. This is represented in FIG. 3—nought, nought, one etcetera. These two parameters can then be compounded into a matrix to produce a unique alphabet of numerical alphabet FIG. 4 shows such an alphabet. Along the rows the 'S' parameter is the number of maxima or minima and down the columns the D parameter is the quantised time duration. However this naturally occurring alphabet has been simplified based on the following observations. For economical coding it has been found acoustically that the number of naturally occurring distinguishable symbols produced by this process may be mapped in a non-linear fashion to form a much smaller number ("Alphabet") of code descriptors and in accordance with a preferred feature of the invention such code or event descriptors produced in the time encoded speech format are used for Voice Recognition. If the speech signal is band limited—for example to 3.5 kHz—then some of the shorter events cannot have maxima or minima. In the preferred embodiment quantising is carried out at 20 Kbits per second. The range of time intervals expected for normal speech is about three to thirty 20 Kbit samples, i.e. three 20 Kbit samples represent one half cycle at 3.3 kHz and thirty 20 Kbit samples represent one half cycle at 300 Hz.

Another important aspect associated with the time encoded speech format is that it is not necessary to quantise the lower frequencies so precisely as the higher frequencies.

Thus referring to FIG. 4, the first three symbols (1,2 and 3), having three different time durations but no maxima and minima, are assigned the same descriptor (1), symbols 6 and 7 are assigned the same descriptor (4), and symbols 8, 9 and 10 are assigned the same descriptor (5) with no shape definition and the descriptor (6) with one maximum or minimum. Thus in this example one ends up with a description of speech in about twenty-six descriptors.

Time Encoded Speech (TES) is a method of encoding varying signals, such as speech signals, the method comprising generating a succession of first signals, each of which represents the duration of a sub-division of a signal to be encoded, and generating a succession of second signals, each signal being one of a set of predetermined signals, each of which represents at least one characteristic of waveform shape of sub-division of the signal to be encoded, the encoding being such that a useful reconstruction of signal which has been encoded can be carried out from the first and second signals only. A sub-division of the signal to be encoded may be any portion of the signal which is defined in any systematic way which depends upon the shape of the signal waveform such as, for example, the shape between crossing of a datum which may or may not be zero and, through usually fixed, may vary in a predetermined way, or, any identifiable re-occurring features of waveform shape.

A method and apparatus for constructing Time Encoded Speech (TES) signals are described in detail in GB patent application 2020517A, the contents of which are specifically included herein by reference.

It is now proposed to explain how these descriptors are used in Voice Recognition and as an example it is appropriate at this point to look at the descriptors defining a word spoken by a given speaker. Take for example the word "SIX". In FIG. 7 is shown part of the time encoded speech symbol steam for this word spoken by the given speaker and this represents the symbol stream which will be produced by an encoder such as the one to be described with reference to FIGS. 5 and 6, utilising the alphabet shown in FIG. 4.

FIG. 7 shows a symbol steam for the word "SIX", and FIG. 8 shows a two dimensioned plot or "A" matrix of time encoded speech events for the word "SIX". Thus the first figure 239 represents the total number of descriptors (1) followed by another descriptor (1). The figure 71 represents the number of descriptors (2) followed each by a descriptor (1). The figure 74 represents the total number of descriptors (1) followed by a (2). And so on. The symbol event descriptors shown in FIG. 8 are merely one example of descriptors which can be derived from the TES symbol stream. Other descriptors can be derived from the TES symbol stream.

The symbol event descriptors shown in FIG. 8 are derived from examining TES symbols occurring adjacent to each other in the TES symbol stream. It will be evident that descriptors may also be derived by examining non adjacent TES symbols in the TES symbol stream. Hence the matrix could be derived by logging each time any TES symbol is recognised to have a predetermined displacement from another TES symbol in the symbol stream. Alternatively, the symbol event descriptors may comprise derivatives of the symbols in the TES symbol stream, or groups of symbols or individual symbols or any combination thereof. Furthermore, numerical descriptions may be derived from the parameters such as describing numerically the location of any symbol event descriptor in the matrix, which numerical description may then be used to examine the voice signal to be recognised.

Additionally examination of the parameters may also be made by examining the location occupied by symbol event descriptors in the matrix without assigning numerical descriptions.

Moreover, the trajectory of a set of parameters, that is, the variation in the distribution or grouping of parameters in the symbol stream of matrix with respect to time may be examined.

This matrix gives a basic set of criteria used to identify a word or a speaker in a preferred embodiment of the invention. Many relationships between the events comprising the matrix are relatively immune to certain variations in the pronounciation of the word. For example the location of the most significant events in the matrix would be relatively immune to changing the length of the word from "SIX" (normally spoken) to "SI . . . IX", spoken in a more long drawn-out manner. It is merely the profile of the time encoded speech events as they occur which would vary in this case and other relationships would identify the speaker It should be noted that the TES symbol stream may be formed to advantage into matrices of higher dimensionality and that the simple two dimensional "A" -matrix is described here for illustration purposes only. By two dimensional, it is meant that the TES symbols are examined in pairs, which as previously stated, may not necessarily be adjacent or consecutive symbols. Hence, examination of the symbols in groups of three would give rise to a three dimensional matrix; and so on, depending upon the number of symbols compared to derive the symbol event descriptors.

Referring back now to FIG. 5, there is shown a flow diagram of a voice recognition system according to an embodiment of the present invention.

The speech utterance from a microphone tape recording or telephone line is fed at "IN" to a pre-processing stage 1 which includes filters to limit the spectral content of the signal from for example 300 Hz to 3.3 kHz. Dependent on the characteristics of the microphone used, some additional pre-processing such as partial differentiation/integration may be required to give the input speech a predetermined spectral content. AC coupling/DC removal may also be required prior to time encoding the speech (TES coding).

FIG. 5a shows one arrangement in which, following the filtering, there is a DC removal stage 2, a first order recursive filter 3 and an ambient noise DC threshold sensing stage 4 which responds only if a DC threshold, dependent upon ambient noise, is exceeded.

The signal then enters a TES coder 5 and one embodiment of this is shown in FIG. 6. Referring to FIG. 6 the band-limited and pre-processed input speech is converted into a TES symbol stream via an A/D converter 6 and suitable RZ logic 7, RZ counter 8, extremum logic 9 and positive minimum and negative maximum counter 10. A programmable read-only-memory 11, and associated logic acts as a look-up table containing the TES alphabets of FIG. 4 to produce an "n" bit TES symbol stream in response to being addressed by a) the count of zero crossings and b) the count of positive minimums and negative maximums such for example as shown for part of the word "SIX" in FIG. 7.

Thus the coding structure of FIG. 4 is programmed into the architecture of the TES coder 5. The TES coder identifies the DS combinations shown on FIG. 4, converts these into the symbols shown appropriately in FIG. 4 and outputs them at the output of the coder 5 and they the form the TES symbol stream.

A clock signal generator 12 synchronises the logic.

From the TES symbol stream is created the appropriate matrix by the matrix feature-pattern extractor 31, FIG. 5, which in this example is a two dimensional "A" matrix. The A-matrix appears in the Feature Pattern Extractor box 31. In this case the pattern to be extracted or the feature to be extracted is the A matrix. That is the two dimensional matrix representation of the TES symbols. At the end of the utterance of the word "six" the two dimensional A matrix which has been formed is compared with the reference patterns previously generated and stored in the Reference Pattern block 21. This comparison takes place in the Feature Pattern Comparison block 41, successive reference patterns being compared with the test pattern of alternatively the test pattern being compared with the sequence of reference patterns, to provide a decision as to which reference pattern best matches the test pattern. This and the other functions shown in the flow diagram of FIG. 5 and within the broken line L are implemented in real time on a Plessey MIPROC computer. A PDP11 has been used as a system builder and loader and to analyse results.

A detailed flow diagram for the matrix formation 31 is shown in FIG. 9. Boxes 34 and 35 correspond to the speech symbol transformation or TES coder 5 of FIG. 5 and the feature pattern extractor or matrix formation box 31 of FIG. 5 corresponds with boxes 32 and 33 of FIG. 9. The flow diagram of FIG. 9 operates as follows:

1. Given input sample $[x_n]$, define "centre clipped" input:

$$[n'_n] = x'_n \text{ if } x * 0$$
$$= +1, \text{ if } x_n = 0 \text{ and } x'_{n-1} * 0$$
$$= -1, \text{ if } x_n = 0 \text{ and } X'_{n-1} * 0$$

2. Define an "epoch" as consecutive samples of like sign.
3. Define "difference" $[d_n]$ $$d_n = x'_n - x'_{n-1}.$$

4. Define "Extremum" at n with value e if $$sgn(d_{n+1})sgn(d_n)*e - s_n' \; 0 \text{ accorded } +\text{ve sign.}$$

5. From the sequence of extrema, delete those pairs whose absolute difference in value is less than a given "fluctuation error".
6. The output from the TES analysis occurs at the first sample of the new epoch. It consists of the number of contained samples and the number of contained extrema.
7. If both numbers fall within given ranges, a TES number is allocated according to a simple mapping. This is done in box 34 "Screening" in FIG. 9.
8. If the number of extrema exceeds the maximum, then this maximum is taken as the input. If the number of extrema is less than 1, then the event is considered as arising from background noise (within the value of the [+ve] fluctuation error) and the delay line is cleared.
9. If the number of samples is greater than the maximum permitted then the delay line is also cleared.
10. The TES numbers are written to a resettable delay line. If the delay line is full then a delayed number is read and the input/output combination is accumulated into an N dimensional matrix, and in this example N=2. Once reset, the delay line must be reaccumulated before the histogram is updated.
11. The assigned number of highest entries ("Significant events") are selected from the histogram and stored with their matrix coordinates, in this example "A" matrix these are two dimensional coordinates to produce for example FIG. 8.

One application of the voice recognition system is illustrated in FIG. 10 of the accompanying drawings. A telephone set comprises a voice recogniser 102 such as already described with reference to FIGS. 5 and 5a. A microphone 103 receives the acoustic signals and feeds them to the recogniser 102 which has a control switch 104/1 for switching it on or off, coupled with a hook switch 104/2. This switch would be pressed to operate each time the 'phone is used and would maintain the recogniser active for a predetermined period until a recognised command had been received. Such commands would include the word "DIAL". There would then follow, for example, the number as a series of digits "zero", "ONE" etcetera to "NINE". The word "PAUSE" would cause a pause in the dialling sequence for inserting dialling pauses for say level nine PABX's. Other commands would include "CANCEL", "OFF HOOK", "ON HOOK" or their equivalent. The command "DIAL" could be arranged to effect the "OFF HOOK" condition for dialling for example.

The TES recogniser would be implemented on a single chip computer such as INTEL 8049 etcetera.

The recogniser has another switch 105, which could also be implemented by voice commands, to switch between a recognising mode in which the telephone is operable, to a training or learning mode, in which the recognisable patterns are generated in the reference pattern store 21, FIG. 5, updated with a changed voice, such as might be necessary when the operator has a cold or with a different-from-usual operator. In a continuous learning machine, the last recognised pattern would be used as a new input of the reference patterns, to replace that reference pattern which had been least frequently used up until that time. By this means as the input voice gradually changes, the recognition matrix would change with it, without the machine having to be specifically re-programmed.

The telephone set may have an automatic dialling chip TCM5089 which is controlled by the recogniser 102.

The reference patterns are generated by speaking the various command words while the system is switched to the training mode. The system will then store the test pattern, e.g. for the word "SIX" in the set 21 of reference patterns.

In the recognition mode the word "SIX" is converted into the A matrix and in the software the feature pattern correlation is carried out whereby all the A or higher dimensional matrices held in store are compared in turn with the A or higher dimensional matrices generated by the spoken command and looks for a relationship which may be a correlation. A delay will be imposed to enable the comparison to be made.

GENERAL

The 26 symbol alphabet used in the current VR evaluation was designed for a digital speech system. The alphabet is structured to produce a minimum bit-rate digital output from an input speech waveform, bandlimited from 300 Hz to 3.3 kHz. To economise on bit-rate, this alphabet maps the three shortest speech segments of duration 1, 2, and 3, time quanta, into the single TES symbol "1". This is a sensible economy for digital speech processing, but for voice recognition, it reduces the options available for discriminating between a variety of different short symbol distributions usually associated with unvoiced sounds.

We have determined that the predominance of "1" symbols resulting from this alphabet and this bandwidth may dominate the 'A' matrix distribution to an extent which limits effective discrimination between some words, when comparing using the simpler distance measures. In these circumstances, more effective discrimination may be obtained by arbitrarily excluding "1" symbols and "1" symbol combinations from the 'A' matrix. Although improving VR scores, this effectively limits the examination/comparison to events associated with a much reduced bandwidth of 2.2 kHz. (0.3 kHz-2.5 kHz). Alternatively and to advantage the TES alphabet may be increased in size to include descriptors for these shorter events.

Under conditions of high background noise alternative TES alphabets could be used to advantage; for example pseudo zeros) PZ and Interpolated zeros (IZ).

As a means for an economical voice recognition algorithm, a very simple TES converter can be considered which produces a TES symbol stream from speech without the need for an A/D converter. The proposal utilises zero crossing detectors, clocks, counters and logic gates. Two zero crossing detectors (ZCD) are used, one operating on the original speech signal, and the other operating on the differentiated speech signal.

The d/dt output can simply provide a count related to the number of extremum in the original speech signal over any specified time interval. The time interval chosen is the time between the real zeros of the signal viz. The number of clock periods between the output of the ZCD associated with the undifferentiated speech signal. These numbers may be paired and manipulated with suitable logic to provide a TES symbol stream.

This option has a number of obvious advantages for commercial embodiments but it lacks the flexibility associated with the A/D version. Nevertheless, it represents a level of 'front end' simplicity which could have a dramatic impact on a number of important commercial factors.

I claim:

1. A method of recognizing voice signals encoded as Time Encoded Speech (TES) in the form of a TES symbol stream, the method comprising the step of encoding the TES symbols corresponding to each word or group of words of said voice signals into a single matrix format of TES symbol event descriptors, each symbol event descriptor being dependent upon the symbols in said TES symbol stream, and comparing matrix formats so formed with single reference matrix formats derived from TES symbols corresponding to each word or group of words of reference voice signals to provide an output indicative of the content of the voice signals.

2. A method according to claim 1 wherein the TES symbol event descriptors of said matrix formats as encoded are compared to said reference matrix formats as to provide the output signal indicative of the content of the voice signals.

3. A method according to claim 2 wherein the TES symbol event descriptors comprise individual time encoded symbols.

4. A method according to claim 2 wherein the TES symbol event descriptors comprise groups of TES symbols.

5. A method according to claim 4 wherein the groups of TES symbols comprise adjacent TES symbols of the stream of TES symbols.

6. A method according to claim 2 wherein the TES symbol event descriptors comprise derivatives of the TES symbols.

7. A method according to claim 2 wherein the TES symbol event descriptors comprise, in any combination thereof, TES symbols and derivatives of the TES symbols.

8. A method according to claim 1 wherein the relationship between the position of said TES symbol event descriptors in said single matrix formats are compared, thereby to provide the output signal indicative of the content of the voice signal.

9. A method according to claim 1 wherein the matrix comprises a two dimensional matrix.

10. A method according to claim 1 wherein the matrix has a dimension greater than two.

11. A method according to claim 1 wherein the reference words are a test voice signal or a stylised or artificial version of that signal.

12. A voice recognition system for voice signals encoded as Time Encoded Speech (TES) in the form of a TES symbol stream, comprising means for encoding the TES symbols corresponding to each word or group of words of said voice signals into a single matrix format of TES symbol event descriptors, each symbol event descriptor being dependent upon the symbols in said TES symbol stream, and means for comparing the single matrix formats so formed with single reference matrix formats derived from TES symbols corresponding to each word or group of words of reference voice signals to provide an output indicative of the content of the voice signals.

13. A voice recognition system according to claim 12, further comprising a feature pattern extractor for coding the time encoded symbols in matrix format.

14. A voice recognition system according to claim 13 wherein the feature pattern extractor comprises a delay unit having a first input arranged to receive a time encoded symbol stream and a further input for receiving a reset signal for resetting the delay unit, and a matrix generator having a first input arranged to receive the time encoded symbol stream and a further input arranged to receive the output signal from the delay unit.

15. A voice recognition system according to claim 12 further comprising an encoder for receiving a voice signal and providing therefrom the time encoded symbol stream.

* * * * *